(12) United States Patent
Guo et al.

(10) Patent No.: US 10,348,730 B2
(45) Date of Patent: Jul. 9, 2019

(54) REDUCING COMPLEXITIES OF AUTHENTICATION AND AUTHORIZATION FOR ENTERPRISE WEB-BASED SOCIAL APPLICATIONS

(71) Applicant: International Business Machines Corporation, Armonk, NY (US)

(72) Inventors: Yu Guo, Westford, MA (US); Patrick Y. Lin, Lexington, MA (US); Joseph Z. Lu, Sharon, MA (US); Ping Wang, Westford, MA (US); Cindy M. Wu, Sharon, MA (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 14/980,792

(22) Filed: Dec. 28, 2015

(65) Prior Publication Data

US 2017/0187714 A1 Jun. 29, 2017

(51) Int. Cl.
*H04L 29/06* (2006.01)
*H04L 29/08* (2006.01)

(52) U.S. Cl.
CPC ........ *H04L 63/0884* (2013.01); *H04L 63/105* (2013.01); *H04L 67/02* (2013.01); *H04L 67/28* (2013.01); *H04L 67/42* (2013.01)

(58) Field of Classification Search
CPC ............. H04L 63/0884; H04L 63/0876; H04L 63/105; H04L 67/02; H04L 67/42; H04L 67/28
USPC ............................................................. 726/3
See application file for complete search history.

(56) References Cited

U.S. PATENT DOCUMENTS

| | | | |
|---|---|---|---|
| 5,878,431 A | 3/1999 | Potterveld et al. | |
| 7,194,664 B1 | 3/2007 | Fung et al. | |
| 7,412,720 B1 | 8/2008 | Frey et al. | |
| 7,448,066 B2 | 11/2008 | Birk et al. | |
| 8,572,267 B2 | 10/2013 | Hartman et al. | |
| 8,645,543 B2 | 2/2014 | Baker et al. | |
| 2003/0088656 A1* | 5/2003 | Wahl | H04L 63/0414 709/223 |
| 2010/0287600 A1 | 11/2010 | King et al. | |
| 2012/0151568 A1* | 6/2012 | Pieczul | H04L 63/0815 726/8 |
| 2014/0068074 A1* | 3/2014 | Goyal | H04L 67/1097 709/225 |

OTHER PUBLICATIONS

Beznosov, K., "On the benefits of decomposing policy engines into components", Proceedings of the 3rd workshop on Adaptive and reflective middleware, ACM, Oct. 2004, pp. 183-188.

* cited by examiner

*Primary Examiner* — Kambiz Zand
*Assistant Examiner* — Aubrey H Wyszynski
(74) *Attorney, Agent, or Firm* — Scully, Scott, Murphy & Presser, P.C.; Reza Sarbakhsh (57) ABSTRACT

Authentication based on a target uniform resource identifier (URI) via security proxies. A framework for creating, updating and deleting authentication groups according to a destination URI may be provided. Each of the authentication groups may have a corresponding adaptable authentication scheme. An access from a client to a server may be classified into an authentication group. An authentication request from the client to the server may be intercepted by an authentication scheme based on the authentication group. A session based cookie may be utilized for supporting access between the client and the server.

12 Claims, 5 Drawing Sheets

REDUCING COMPLEXITIES OF AUTHENTICATION AND AUTHORIZATION FOR ENTERPRISE WEB-BASED SOCIAL APPLICATIONS

FIELD

The present application relates generally to computers and computer applications, and more particularly to computer security and authentication.

BACKGROUND

When deploying highly secure and tightly integrated enterprise web based social applications, specific authentication and authorization rules can outgrow very quickly. Applications running on Social Business platform are people oriented and inter-mingled across other applications through a single sign-on (SSO) with characteristics of end-users' highly interested rich feature set. Such applications have been developed dynamically to be bundled together into a growing number of security realms upon social business platform. All the integration efforts, however, tend to increase security complexities, and make it more difficult to manage, for example, requiring both administrative efforts on the third-party security proxies and web based applications jointly setting up intrinsic security rules.

BRIEF SUMMARY

A computer-implemented method and system of authentication based on a target uniform resource identifier (URI) via security proxies may be provided. The method in one aspect may include providing a framework for creating, updating and deleting authentication groups according to a destination URI, each of the authentication groups having a corresponding adaptable authentication scheme. The method may also include classifying an access from a client to a server into an authentication group. The method may also include intercepting an authentication request from the client to the server by an authentication scheme based on the authentication group. The method may also include utilizing a session based cookie for supporting access between the client and the server.

A system of authenticating based on a target uniform resource identifier (URI) via security proxies, in one aspect, may include one or more processors. One or more of the processors may be operable to provide a framework for creating, updating and deleting authentication groups according to a destination URI, each of the authentication groups having a corresponding adaptable authentication scheme. One or more of the processors may be further operable to classify an access from a client to a server into an authentication group. One or more of the processors may be further operable to intercept an authentication request from the client to the server by an authentication scheme based on the authentication group. One or more of the processors may be further operable to utilize a session based cookie for supporting access between the client and the server.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and techniques may be provided that in one embodiment handle computer security proxies, provide centralized control and, for example, may overcome configuration and deployment complexities. In one embodiment, system, method and techniques of the present disclosure may provide for self-contained centralized controls of authentication access control list (ACL) at development phase. An intelligent layer may be asserted to affirm the simplicity of deployment and configuration efforts. The system, method and techniques may improve computer technology by effecting high portability and scalability. In addition, a self-contained centralized control may reduce administrative cost and errors that may occur in computer security configuration and deployment.

In one embodiment, the complexity of web based Uniform Resource Locator (URL) patterns may be reduced or eliminated such that security policy and services may gain more granularity to protect web bases resources through authentication/authorization methodologies.

A web service or a product in the social business platform may have a large number of different URL patterns to configure in security policy services in order to manage computer security. In one embodiment of the present disclosure, security policy needs may be accommodated in a programmable approach without adding extra burden onto third parties' policy servers.

In one embodiment, a method and system of the present disclosure handle authentication based on target uniform resource identifier (URI) such as the URL through security proxies. For instance, a framework is provided for creating, reading, updating and deleting authentication groups according to a destination URI wherein each authentication group has a corresponding adaptable authentication scheme. An adaptable authentication scheme may be provided via configurable extensive markup language (XML) files. An access from a client to a server may be classified into an authentication group. An authentication request from the client to a server may be intercepted according to an authentication scheme based on the authentication group. Session based cookies may be utilized for supporting access between the client and the server. In one embodiment, the authentication groups may include basic, form, anonymous, and strong (e.g., cryptographic tickets and/or certifications) categorizations. An adaptable authentication scheme in one embodiment supports programmable redirected traffic allowing sending forward a basic process within security proxies, returning back to the end-user's browsers, processing based on URL patterns managed in configurable extensive markup language (XML) files, and securely storing security credential information into encrypted storage space.

Figure 1:
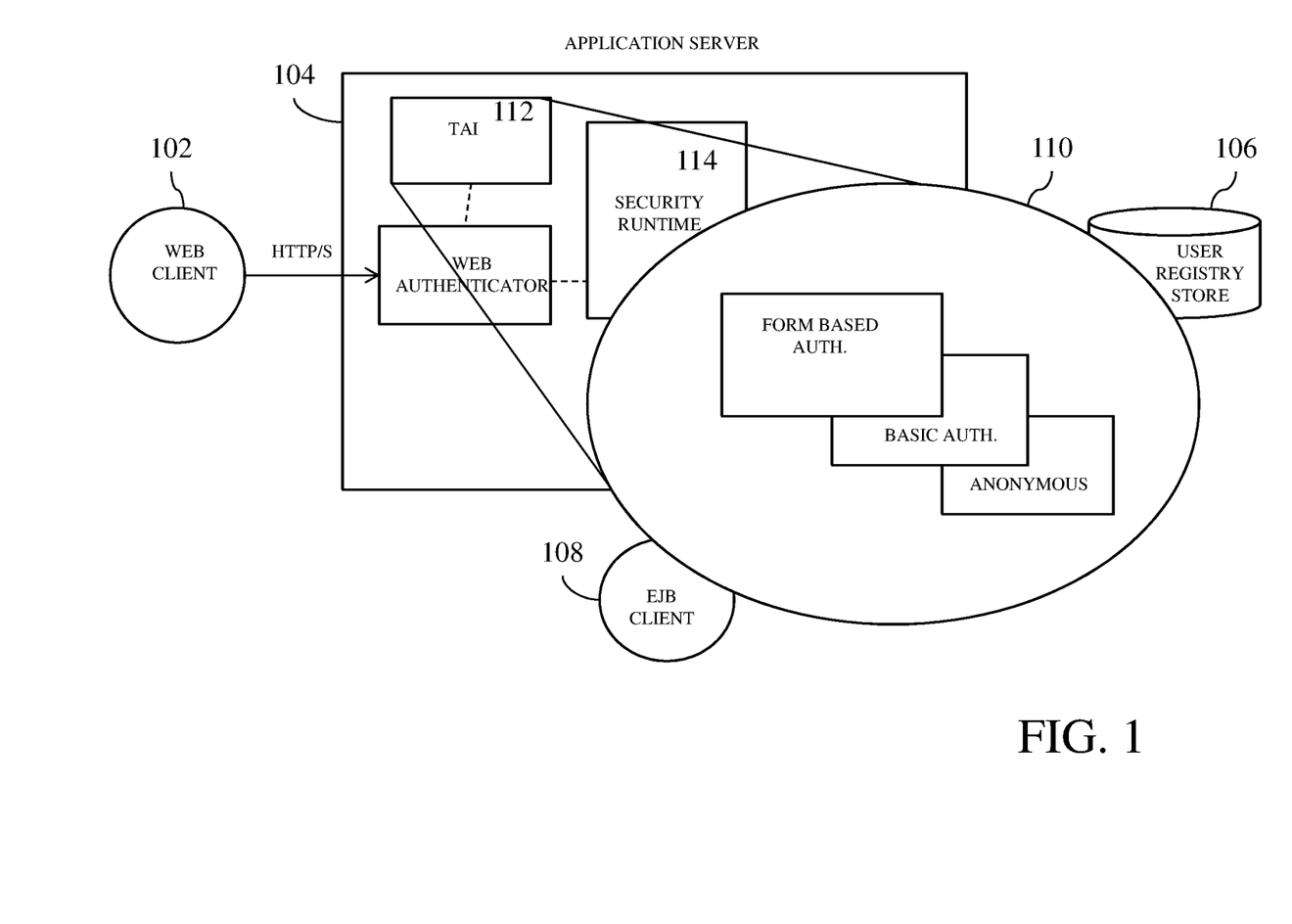
FIG. 1 is a diagram showing the modules of the present disclosure providing authentication methods in one embodiment.

FIG. 1 is a diagram showing mushroom modules of the present disclosure providing authentication methods in one embodiment in an application server (also referred to as a web application server) authentication procedure. Particularly, the diagram illustrates a J2EE authentication flow used by IBM® WebSphere™ application server (WAS), from International Business Machines Corporation, Armonk, N.Y. The modules may be implemented for an application server, for example, and may augment a component used in application server authentication procedure such as the trust association interface (TAI). TAI is a service provider API that enables the integration of third-party security services with an application server.

A web client component 102, for example, a browser, may be used to login to a server. During a server login, login information such as a user identifier or identification (ID) and password, is provided to verify the user's authenticity. Other login information such as a certificate from a secure socket layer (SSL session), or a single sign-on token from a browser, or others, may be provided. This information may be authenticated or validated. As resources are being accessed, the information may be used to make authorization decisions.

For instance, a user ID and password from a web client 102 may be accepted via Hypertext Transfer Protocol (HTTP) or Hypertext Transfer Protocol Secure (HTTPS). An application server 104 may take this information and lookup up the user's unique ID in a registry 106, and verify the password against the registry 106. In another aspect, a web server may perform client certificate authentication, for example, if the client is being authenticated with a certificate. Once authentication has occurred, a single sign-on (SSO) token is created and sent back to the Web client 102 (e.g., a browser) as a cookie, and the security credential may be cached by the security runtime. An Enterprise Java Beans (EJB) client 108 may be also authenticated using passwords or certificates.

In one embodiment, the web application supported identity assertion may be utilized in the methodology of the present disclosure in one embodiment. For instance, the web application server may accept the identity based on a trust relationship with an entity that vouches for the asserted identity. For instance, a client (102, 108) may pass identity information to the application server 104 by using a trust association interceptor (TAI) 112. The TAI interface provides a mechanism by which the application server enables an external component to authenticate the user and then assert the identity to the web application server web container.

TAIs may be used in conjunction with a web authentication proxy server, which authenticate the user and inform the application server 104 as to the end-user's identity. This may be done by the proxy server sending the user's ID and additional verifiable information to the application server 104. The TAI 112 extracts this information and returns the user's ID or the like to the application server 104.

An embodiment of the present disclosure implements modules 110 (referred to above as authentication groups), each of which accomplishes its own authentication method as well as a programmable redirected traffic, sending forward to one of the basic process within security proxies or returning back to the end-users' browsers. Each module is responsible for its own path based upon the URL patterns managed in the configurable extensible markup language (XML) file. The modules are referred to as 'mushroom' modules for sake of explanation.

In one embodiment, the mushroom module 110 can be configured, managed, instantiated, and executed with all Web based enterprise applications and its platform, J2EE enterprise server, e.g., IBM WebSphere Application Server. In one embodiment, this module includes executable JAVA archive (JAR) and configurable XML, or like components. In one embodiment, the module includes one executable object. In one embodiment, the module includes many XML for each instance, to handle different authentication mechanisms. Authentication mechanism can be categorized as none, simple and strong. For example, if there is a need for none authentication to public pages such as login pages, then "anonymous" XML (e.g., an XML configuration file designated as anonymous) is configured as part of the mushroom module. If simple authentication is in need, while user name and password must be carried over through HTTP header as part of the requests, then "basic authN" XML (e.g., an XML configuration file designated as basic authentication) is added to this module. In one embodiment, this concept is applied to "Form based authN" and all other "cryptographic authN" referred to as a strong methodology as needed (e.g., an XML configuration file designated for strong authentication mechanism). In one embodiment, system administrator may be able to "modify" those configurations upon existing templates. For example, a framework is provided with a user interface or a graphical user interface (GUI) that allows a user such as a system administrator to create a configuration file (e.g., an XML file) specific to a particular authentication mechanism. In one embodiment, an entire set of protected and unprotected resources of all Web based enterprise applications running on a social business platform can be presented in a graphical user interface (GUI) to allow system administrators to manage those resources and to select desired authentication mechanism, for example, to fit their security needs. In one embodiment, the default choices may be preset for users, for example, system administrators.

In one embodiment of the present disclosure, the mushroom modules are implemented within the TAI. Once service requests are received from the Web client 102, one of the mushroom modules 110 intercepts the traffic and determines whether it is good to forward to the Web container services or whether to redirect it to a security module such as third party security proxies or web application server (e.g., Websphere Application Server (WAS)) security runtime 114. If valid cookies or tokens are available within the session of traffic, then the mushroom module 110 managing the traffic regarding the URL pattern may forward that traffic to the Web container. Otherwise, authentication process may be kicked in by redirecting the traffic to a security store. In one embodiment, this redirected URL can only be one fixed destiny per module. For example, every URL is considered a resource to be protected, for example, in one way or another. In one embodiment, no ambiguity is to be allowed to conditionally grant one authN mechanism to a given URL. Therefore, "unconditional election" is applied to a URL level, once for all. For example, the login page is not protected and it is always associated with an "anonymous" setting. Therefore, the same resource can be protected only in one way. For instance, the same resource cannot be protected using 'basic authN' under certain conditions, while 'Form based authN' could also be given under other conditions. If "SPNEGO" (Simple and Protected Generic Security Service Application Program Interface (GSSAPI)

Negotiation Mechanism (SPNEGO)) or "Kerberos" (Kerberos is a computer network authentication protocol used for strong authentication and uses secret-key cryptography) is in use, then the "Simple" authN will be replaced with the "Strong" without compromise. This implies that a manual procedure to configure multiple URL patterns into third party policy services is not needed and simplifies the extra procedures needed to handle security policy with all third parties. In one aspect, the complexity and focus point is shifted from third party to the mushroom module of the present disclosure in one embodiment. The mushroom module handles the resources presented in URL through a comprehensive GUI, which is identical to users in one embodiment, regardless of which third party security package the users have adapted.

In one embodiment, an exception may be implemented for a mushroom module, for example, anonymous module, such that it always forwards the original traffic to the Web container without validating cookies or tokens. For instance, because the anonymously accessible resources imply no security protection and coverage, there is no need for authentication process and security check-points.

FIG. 1 shows examples of pluggable and expandable authentication mechanism(s). In one embodiment, each authentication (authN) may be implemented as a class, and packaged as part of the JAR in the mushroom. In one embodiment, the mushroom is loaded into memory in runtime. The mushroom determines via the configurable XML(s) the needed authN class to initialize and instantiate, and initializes and instantiates the authN class. In one embodiment, those configurable XML(s) are loaded into memory once in runtime. In one embodiment, all registered resources across all Web based enterprise applications may be covered by an authN class (which may be different for different registered resources) as the mushroom grows.

Figure 2:
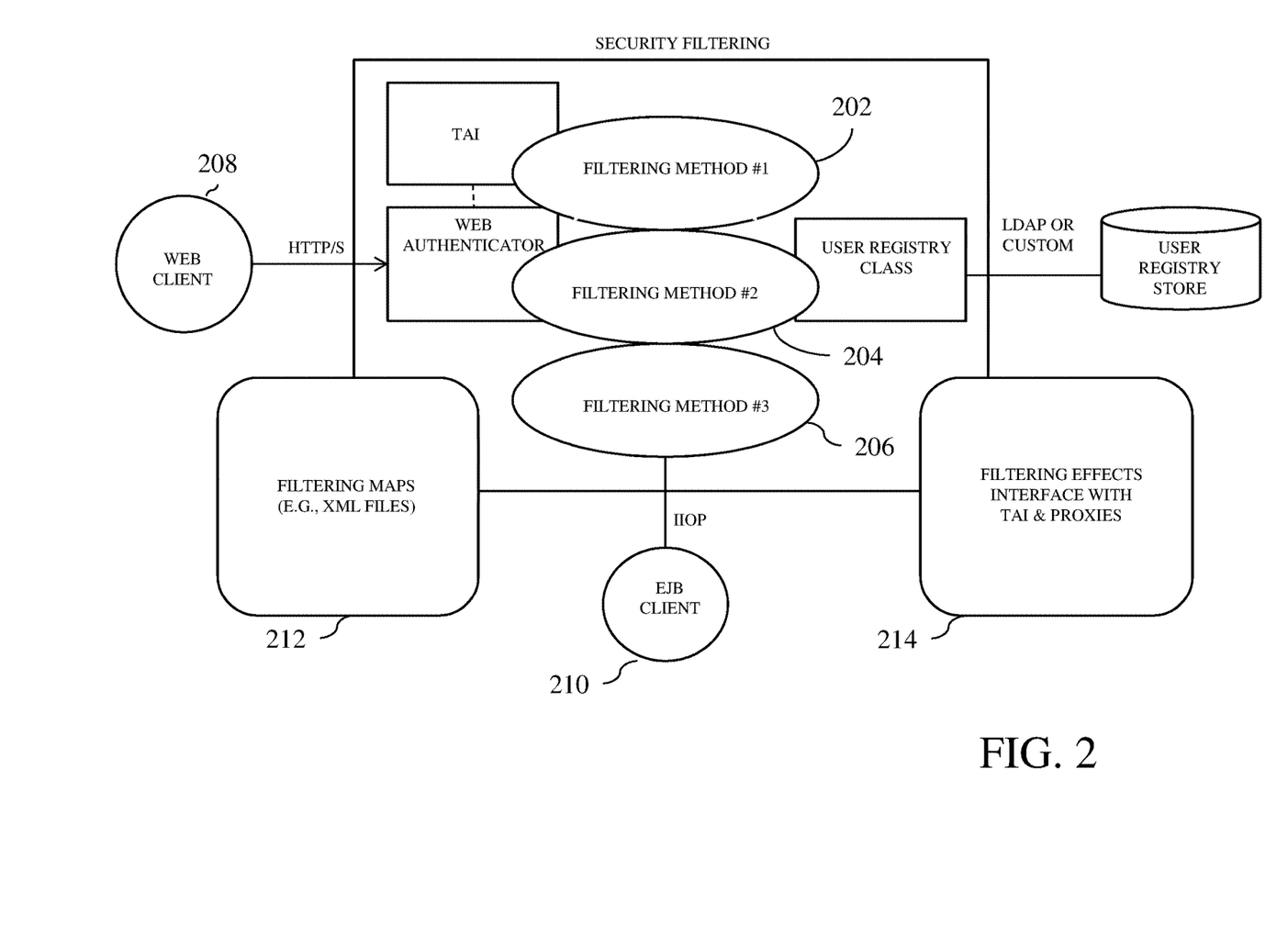
FIG. 2 is a diagram showing filtering methods in one embodiment of the present disclosure.

FIG. 2 is a diagram showing filtering methods in one embodiment of the present disclosure. Responsive to performing the authentication process successfully, a mushroom module continues to respond back to end-users with valid cookies or tokens. A browser then is able to deliver end-users' original requests with valid cookies or tokens for the subsequent runs within the same session. This mushroom module guards against the original URL pattern, is able to validate single sign-on (SSO) cookies, and forwards the original requests to the proper destinations within the Web container. For instance, the appropriate filtering method 202, 204, 206 may be employed for a URL pattern received from a web client 208, for example, via an HTTP or HTTPS or the like, that validates a cookie or token in the URL pattern, and once validated forwards the traffic to a Web container. Similarly, the appropriate filtering method 202, 204, 206 may be employed for a URL pattern received from an EJB client 210, which validates a cookie or token in the URL pattern, and once validated forwards the traffic to a Web container.

In one embodiment, the filtering maps 212 handle multiple XML(s), which are validated, read through, and loaded into memory, so that the mushroom module knows each of them singularly and all of them entirely. In one embodiment, the filtering effects interface 214 handles business logic to interact with a web application server's (e.g., WAS) security core and TAI. In one embodiment, the mushroom module provides an enhancement to supplement a security module of an application server (e.g., WAS).

Figure 3:
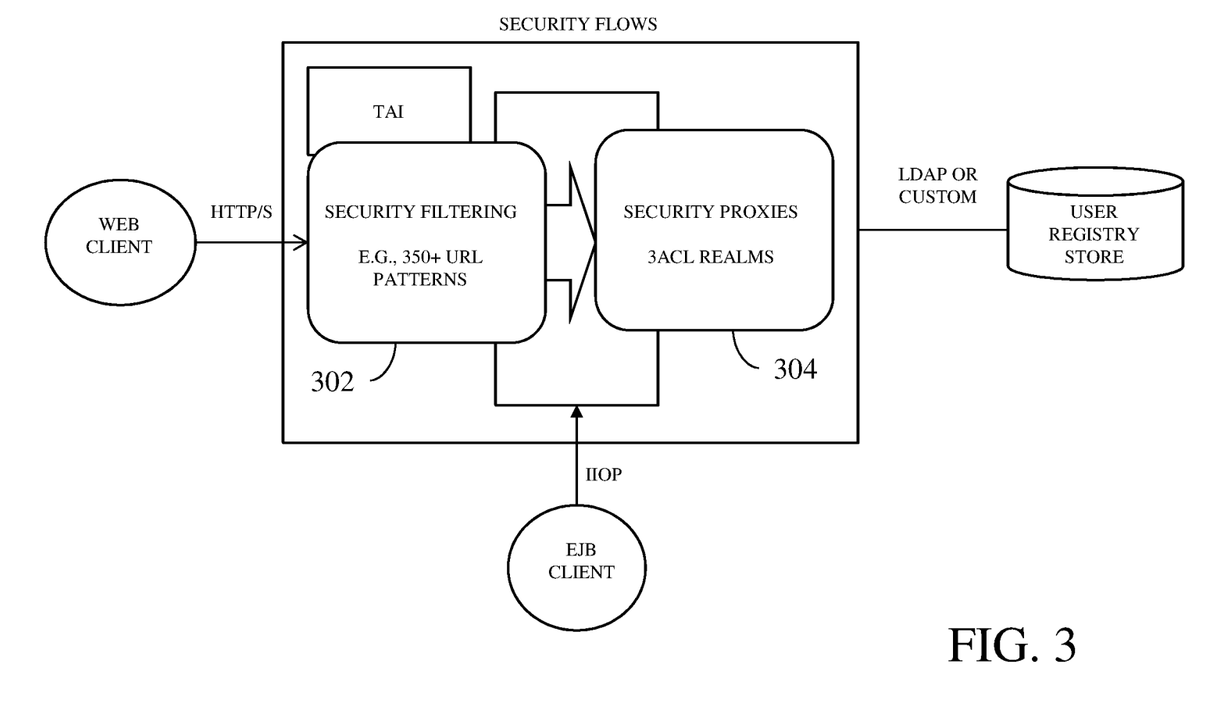
FIG. 3 shows an authentication flow in one embodiment of the present disclosure.

FIG. 3 shows an authentication flow of network traffic in one embodiment of the present disclosure. A number of URLs may be registered, for example, one for each mushroom module. For example, if 3 URLs are registered, there may be 3 mushroom modules. Examples of registered URLs may include, but are not limited to, "/siteminder/form-basedAuth", "/siteminder/basicAuth", and "/siteminder/anonymous." For example, the first example URL may be used for the "Form based Authentication" authentication schema. The second example URL may be used for the "Basic Authentication" authentication schema. The third example URL may be used for the "anonymous" access, which may not have any protection by a third party security proxy.

An example browser based network traffic flow may include the following flow. Initial browser traffic may include an application URL (e.g., https://host/profiles/myprofile). A mushroom module performs its determination. The mushroom module includes XMLs that define rules and laws and regulates the authentication (authN) for any given URL. For example, the mushroom may exam this traffic to determine whether or not it is a protected resource. For instance, a configuration in an XML associated with the mushroom may specify that the traffic is a protected resource, e.g., it is to be protected and rely on form-based authorization.

If the traffic is to be protected, the mushroom at 302 intercepts the traffic and spawns a redirect to a third party authentication end-point (e.g., a security proxy 304), an authentication Login URL (e.g., https://host/login) with the local reference pointing back to the original Application URL (e.g., https://host/profiles/myprofile).

In authentication phase, an end-user interacts with this redirected Login URL page and accomplishes the authentication process. For example, the user may enter the user ID and password, or the like. If the authentication process fails, the entire flow may be considered as failed at this point.

If the authentication is successful, a security proxy's web server agent creates a session manager (SM) session based cookie (authentication cookies) and returns the cookie back to the browser. In one embodiment, the mushroom determines the work-flow upon cookies in order to properly interact with a security proxy or an application server by preserving and passing along all existing cookies to them.

The browser carries the SM session based cookie and returns to the original Application URL (e.g., https://host/profiles/myprofile).

The mushroom module validates the SM session based cookies (authentication cookies) through background traffic. In one embodiment, the configurable XMLs are configured with information that allows the mushroom to determine the work-flow upon cookies.

SSO Cookies provide an extra loop of hitting the Validation URL (e.g., https://host/validate), which may run into the Application Server Agent. This loop is used to exam the existing SM session based cookies and to communicate with a security proxy TAI, which further communicates with a web application server's security module. If all check-points pass through properly, the web application server security module generates Lightweight Third Party Authentication (LTPA) cookies. All the subsequent traffic may rely on the SSO mechanism.

Figure 4:
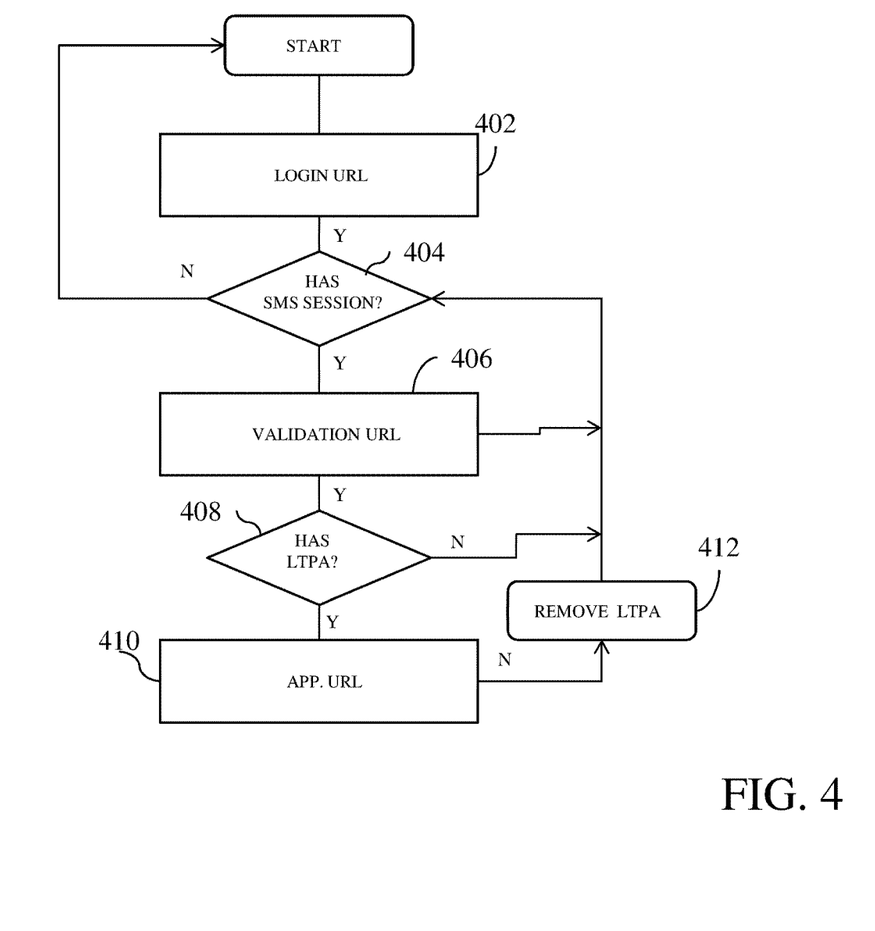
FIG. 4 is a diagram that illustrates a login URL, validation URL and an application URL in one embodiment of the present disclosure.

FIG. 4 is a diagram that illustrates a login URL, validation URL and an application URL in one embodiment of the present disclosure. At 402, a login URL is received and it is determined at 404 whether SM session has started. If no, authentication process is performed, e.g., where the traffic may be redirected to a security proxy for client authentication and/or validation and creation of an SSO cookie. At 406, validation URL is received and at 408, it is determined whether an LTPA cookie has been generated. If no, validation process may be performed in which existing SM session based cookie may be examined, and an LTPA cookie generated. If at 408, it is determined that an LTPA cookie has been generated, an application URL may be received at 410, in which the traffic is directed to a web container associated with the application specified by the URL. The LTPA cookie may be removed after processing the Application URL at 412.

Figure 5:
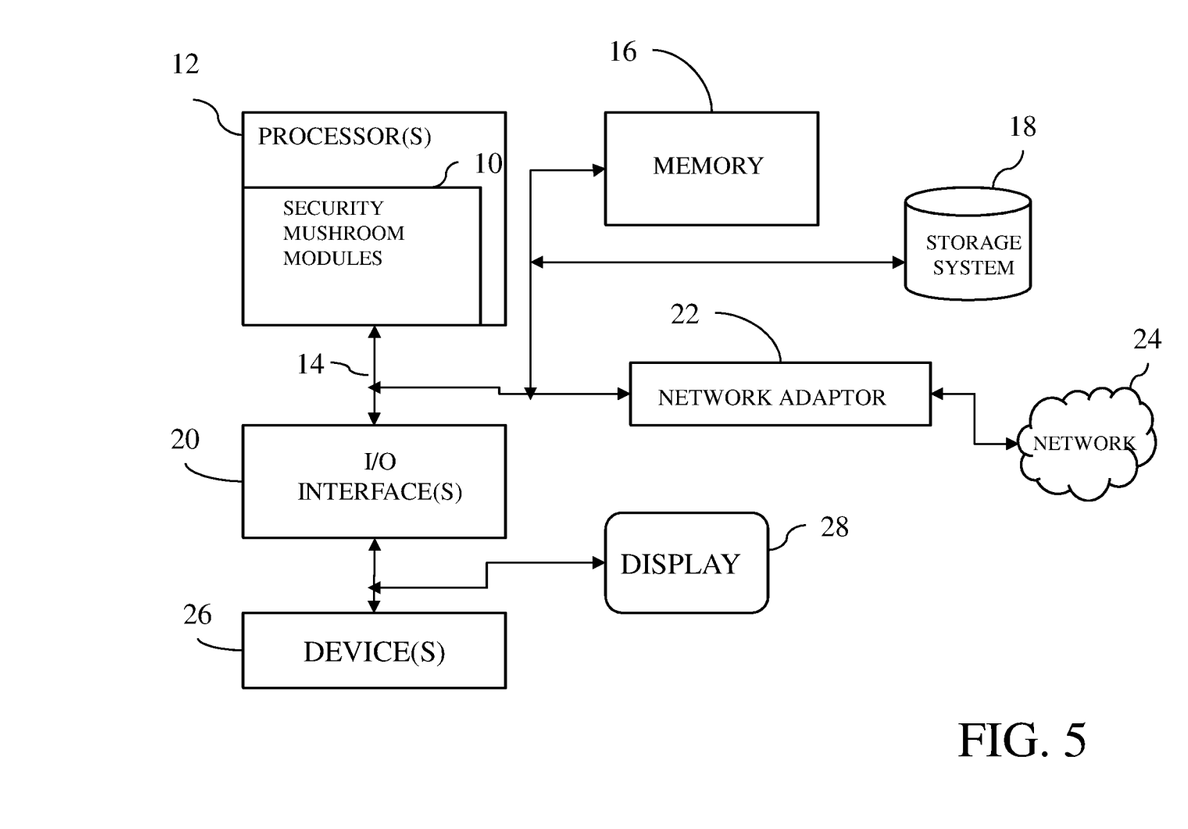
FIG. 5 illustrates a schematic of an example computer or processing system that may implement a system in one embodiment of the present disclosure.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include mushroom modules 10 that perform the methods described herein. The modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of authentication based on a target uniform resource identifier (URI) via security proxies, comprising:
   providing a framework for creating, updating and deleting authentication groups according to a destination URI, each of the authentication groups having a corresponding adaptable authentication scheme, wherein the destination URI is associated with a corresponding authentication group;
   classifying an access from a client to a server into an authentication group of the authentication groups, the authentication groups comprising a form-based authentication group indicative of requiring name and password protection, anonymous authentication group indicative of requiring no protection and a strong authentication group indicative of requiring cryptographic authentication protection;

intercepting a request from the client to the server by an authentication scheme based on the authentication group associated with a URI of the request, the authentication scheme comprising an executable object instantiated and executed to intercept the request, the authentication scheme further comprising multiple configurations to handle different authentication groups, the authentication scheme determining whether to forward the request directly to the server or whether to redirect the request to a security proxy; and utilizing a session based cookie for supporting access between the client and the server.

2. The method of claim 1, wherein the adaptable authentication scheme supports programmable redirected traffic allowing sending forward a basic process within security proxies, returning back to an end-user's browser, processing based on uniform resource locator (URL) patterns managed in a configurable extended markup language (XML) file.

3. The method of claim 1, wherein the authentication scheme is implemented with a trust association interface associated with a web application server.

4. The method of claim 1, wherein the session based cookie is generated by a security proxy.

5. A non-transitory computer readable storage medium storing a program of instructions executable by a machine to perform a method of authentication based on a target uniform resource identifier (URI) via security proxies, comprising:

providing a framework for creating, updating and deleting authentication groups according to a destination URI, each of the authentication groups having a corresponding adaptable authentication scheme, wherein the destination URI is associated with a corresponding authentication group;

classifying an access from a client to a server into an authentication group of the authentication groups, the authentication groups comprising a form-based authentication group indicative of requiring name and password protection, anonymous authentication group indicative of requiring no protection and a strong authentication group indicative of requiring cryptographic authentication protection;

intercepting a request from the client to the server by an authentication scheme based on the authentication group associated with a URI of the request, the authentication scheme comprising an executable object instantiated and executed to intercept the request, the authentication scheme further comprising multiple configurations to handle different authentication groups, the authentication scheme determining whether to forward the request directly to the server or whether to redirect the request to a security proxy; and utilizing a session based cookie for supporting access between the client and the server.

6. The non-transitory computer readable storage medium of claim 5, wherein the adaptable authentication scheme supports programmable redirected traffic allowing sending forward a basic process within security proxies, returning back to an end-user's browser, processing based on uniform resource locator (URL) patterns managed in a configurable extended markup language (XML) file.

7. The non-transitory computer readable storage medium of claim 5, wherein the authentication scheme is implemented with a trust association interface associated with a web application server.

8. The non-transitory computer readable storage medium of claim 5, wherein the session based cookie is generated by a security proxy.

9. A system of authenticating based on a target uniform resource identifier (URI) via security proxies, comprising:

one or more processors;

one or more of the processors operable to provide a framework for creating, updating and deleting authentication groups according to a destination URI, each of the authentication groups having a corresponding adaptable authentication scheme, wherein the destination URI is associated with a corresponding authentication group, one or more of the processors further operable to classify an access from a client to a server into an authentication group of the authentication groups, the authentication groups comprising a form-based authentication group indicative of requiring name and password protection, anonymous authentication group indicative of requiring no protection and a strong authentication group indicative of requiring cryptographic authentication protection, one or more of the processors further operable to intercept a request from the client to the server by an authentication scheme based on the authentication group associated with a URI of the request, the authentication scheme comprising an executable object instantiated and executed to intercept the request, the authentication scheme further comprising multiple configurations to handle different authentication groups, the authentication scheme determining whether to forward the request directly to the server or whether to redirect the request to a security proxy, one or more of the processors further operable to utilize a session based cookie for supporting access between the client and the server.

10. The system of claim 9, wherein the adaptable authentication scheme supports programmable redirected traffic allowing sending forward a basic process within security proxies, returning back to an end-user's browser, processing based on uniform resource locator (URL) patterns managed in a configurable extended markup language (XML) file.

11. The system of claim 9, wherein the authentication scheme is implemented with a trust association interface associated with a web application server.

12. The system of claim 9, wherein the session based cookie is generated by a security proxy.

* * * * *